United States Patent [19]
Brekle et al.

[11] 3,939,566
[45] Feb. 24, 1976

[54] COPYING TRACER PARTICULARLY FOR STAMPING MACHINES

[75] Inventors: Erich Brekle, Benningen; Eugen Herb, Ditzingen; Hans Klingel, Moglingen, all of Germany

[73] Assignee: Firma Trumph Maschinene AG, Switzerland

[22] Filed: Sept. 12, 1974

[21] Appl. No.: 505,249

[30] Foreign Application Priority Data
Sept. 15, 1973   Germany............................ 2346541

[52] U.S. Cl. ..................... 33/23 K; 83/565; 408/3
[51] Int. Cl.² ..................... B23B 39/26; B26D 5/02
[58] Field of Search ............ 33/23 K; 83/565; 408/3

[56]         References Cited
         UNITED STATES PATENTS

| 447,014 | 2/1891 | Pryibil..................................... 408/3 |
| 2,873,629 | 2/1959 | Frautschi.............................. 408/3 |
| 2,918,835 | 12/1959 | Watson et al...................... 408/3 X |
| 2,975,661 | 3/1961 | Coleman................................ 408/3 |
| 3,546,978 | 12/1970 | Keown.............................. 83/565 X |

*Primary Examiner*—Richard E. Aegerter
*Assistant Examiner*—Charles E. Phillips
*Attorney, Agent, or Firm*—McGlew and Tuttle

[57]         ABSTRACT

A copying tracer for tracing templates which have hollows or recesses or bores, particularly for stamping or nibbling machines, comprises a housing with a bore therein with a copying tracer plunger portion slidable in the bore which has a lower end which engages the template. The tracer plunger is biased by biasing means which act to provide a uniform downward biasing pressure on the plunger to engage the lower template engaging end portion of the tracer with the template and which is increased when the template begins to move downwardly, such as when it enters a recess or a groove, so that the movement becomes very rapid. The biasing may be accomplished by a spring system which includes one coil spring acting axially along the axis of the plunger tracer and an additional spring which is locked when the tracer engages the surface of the template but which moves transversely and acts against the plunger in a downward component of force after the tracer is initially moved downwardly. Another embodiment comprises a fluid pressure operated system wherein the plunger is first forced downwardly into engagement with the template by a first pressure source acting on the plunger which is by-passed partially around the plunger, but which acts entirely on the plunger after it is moved initially downwardly.

11 Claims, 4 Drawing Figures

COPYING TRACER PARTICULARLY FOR STAMPING MACHINES

FIELD AND BACKGROUND OF THE INVENTION

This invention relates in general to the construction of copying tracers and, in particular, to a new and useful copying tracer which includes means for biasing it into engagement with a template and to increase the biasing force and the action movement of the tracer when the tracer enters into a groove or recess or bore of the template.

DESCRIPTION OF THE PRIOR ART

The invention is concerned with a copying tracer, particularly for tracing templates, which have hollows, recesses or bores of a type which are used with stamping and nibbling machines. Such a tracer includes a device for pressing the tracer into contact with the template. As soon as the copying tracer reaches a hollow or bore or other depression, it is pressed therein by the pressing device. After this occurs, a command signal may be released for the stamping or nibbling machine. In such a way, the copying tracer which is connected to the coordinate guiding system for the workpiece traces the entire template. If, for example, the copying tracer or its tracing point engages a bore of the template, the workpiece is fixed in its predetermined position through the tracer and the coordinate guidance.

As soon as the point or contact surface of the tracer, which is preferably conically formed on its side, engages into a depression, the copying tracer is pressed therein. This requires a force. In cases where the copying tracer is operated manually, which is usual, the operator is subjected to a considerable physical stress. A replacement of the manual force by a spring force has the drawback that the characteristic of a spring is exactly opposed to the needed effect. The deeper the copying tracer or its tracing point engages into a bore, the smaller is the spring pressure force. For the centering, however, such an increased force is necessary. If the pressing force is chosen very high from the beginning, then the template becomes too heavily loaded by the tracer. Unnecessary friction losses result from this loading. If the pressing force is too small, the tracer, and thereby the workpiece, is centered too slowly, and this leads to inaccuracies and is therefore very disadvantageous. A small pressing force is not capable of pressing the tracer completely into the bore.

SUMMARY OF THE INVENTION

In accordance with the invention, a copying tracer which is equipped with a switchable or controllable additional presser mechanism and/or a pressure booster, includes a tracer having a plunger or piston portion which is movable in a bore of a housing. The additional presser and/or the pressure booster is put into operation to press the copying tracer on the control of a switch or other control signal which is effected by movement of the tracer itself. The increased pressure is applied to move the tracer down with an increased force. This force must be applied at the time when the tracer begins to enter a bore or a depression, and it is necessary, in order to increase the entering speed and to accelerate the centering of the copying tracer in the bore, to provide for a sufficient contact pressure. By providing this additional force for moving the tracer, a desirable improved stamping result is achieved.

In accordance with a further feature of the invention, the additional biasing force or pressure on the tracer is effective only at the time the copying tracer engages into the bore. In order that the force be transmitted at the most advantageous instant, the tracer is constructed as a switch or control member for effecting the additional presser or pressure force. Thus the switching, coupling or connecting of the additional presser and/or pressure booster to the pressing device is effected by the motion of the copying tracer or by a member connected thereto. This results in a high accuracy of the switching or coupling.

In accordance with another feature of the invention, the additional presser comprises a spring-loaded slider which is movable transversely to the copying tracer and which is interlocked with the copying tracer while the tracer is at least partly lowered into the depression. After the movement occurs, the slider is unlocked and applies a pressure loading of the tracer to transmit a downward force thereon to urge the tracer into the depression. The construction is such that an initial interlocking of the slider prevents it from acting to supply a permanent additional force on the tracer, but the downward movement of the tracer is effective to automatically release the slider for the supply of the additional pressing force for moving the tracer into the bore. The slider may, for example, be arranged to move either parallel to, or at an angle to the tracer itself, just so long as it acts with a component of force to urge the tracer into engagement on the pattern and into the depression thereof.

In a preferred embodiment, the tracer is actuated by a pressing system which is supplied by fluid pressure, and preferably pneumatically. However, if compressed air is not provided at the stamping machine, a hydraulic, electric or electromagnetic actuation may also be employed.

In a particularly preferably embodiment of the invention, the pressure booster comprises a choke, which is adapted to be shut off or pneumatically separated, and it is located in an outlet passage which is connected to the pressure cylinder of the pressing device. Thus, the pressure cylinder of the pressing device is connected at its one side to a supply line, and at its other side to the outlet passage. The choke is mounted in the outlet passage and provides a means for the slow escape of the air contained in the pressure cylinder. This escaping air is, of course, continuously replaced by a new supply of air. Due to the choke, only a limited pressure can build up in the pressure cylinder. As soon as the choke is shut off by a corresponding command signal, or its connection to the pressure cylinder of the pressing device is interrupted, a higher pressure may develop in the pressure cylinder causing the desired increased contact pressure and the accelerated penetration of the copying tracer into the depression. The shutting off of the choke or of the connection conduit to the choke is made dependent on the movement of the copying tracer entering the bore or depression. Consequently, the increase of the contact pressure is obtained by shutting off the choke, and the contact pressure is released by opening or connecting the choke.

Accordingly, it is an object of the invention to provide a copying tracer which is movable along the surface of a template and into a bore or depression thereof, and which comprises a housing having a bore therein with a copying tracer movable in the bore of the housing which has a contact surface which is engageable with the template and which includes pressure means in said housing acting on said tracer to apply a biasing force against the tracer to continuously urge it against the template and to apply an increased biasing force against the tracer when the tracer itself is intially displaced downwardly below the template surface into a depression thereof.

A further object of the invention is to provide a copying tracer which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Referring to the drawings in particular, the invention embodied therein comprises a copying tracer, generally designated 50, which includes a housing 8, having a bore 7 in which a copying tracer, in the form of a plunger 4, is movable. Tracer 4 includes an end portion 3 which terminates in a conical tip 2, which has a surface which is maintained in pressure engagement with a template 1.

In accordance with the invention, pressure means are provided in housing 8 for biasing or forcing tracer 4 in a direction to cause its contact end to engage against template 1. Normally, this pressure means includes only a spring 5 acting on a top surface 4a to urge the tracer 4 downwardly to engage template 1. Tracer 4 includes a collar portion 6 movable thereby which rides in an enlarged groove or bore portion 7'. An inner end portion of copying tracer 4, which extends above collar 6, carries two coaxially projecting pins 9 and 9', but pin 9' is not shown. In accordance with a feature of the invention, the pressure means also includes a slider or separate force applicator 11 with a forked end with leg portions which engage on each side of the tracer 4 and bear with their oblique ends 10 against the respective pins 9 and 9'. The pressure means also includes a spring 12 which applies a biasing force against slider 11 which is transmitted through pins 9 in a component force direction which is substantially parallel to the axis of the tracer, but only when tracer 4 is unlocked from the position indicated in FIG. 1.

In the position shown in FIG. 1, the slider 11 is pressed against collar 6 of the copying machine, and collar 6 is engaged within a notch 14 of slider 11, so that the slider cannot be released until tracer 4 moves downwardly below its plane of operation where the end engages on the surface of template 1. As soon as the tracer or its end 2 engages a bore 13 in template 1, the tracer 4 begins to move downwardly to immediately disengage collar 6 from notch 14 and to immediately permit sliding movement of the slider 11 so as to provide an additional downward biasing force on tracer 4. This additional pressure or biasing force acting on tracer 4 causes the tracer to be centered in an accelerated manner and with a stronger force acting thereon.

Figure 1:
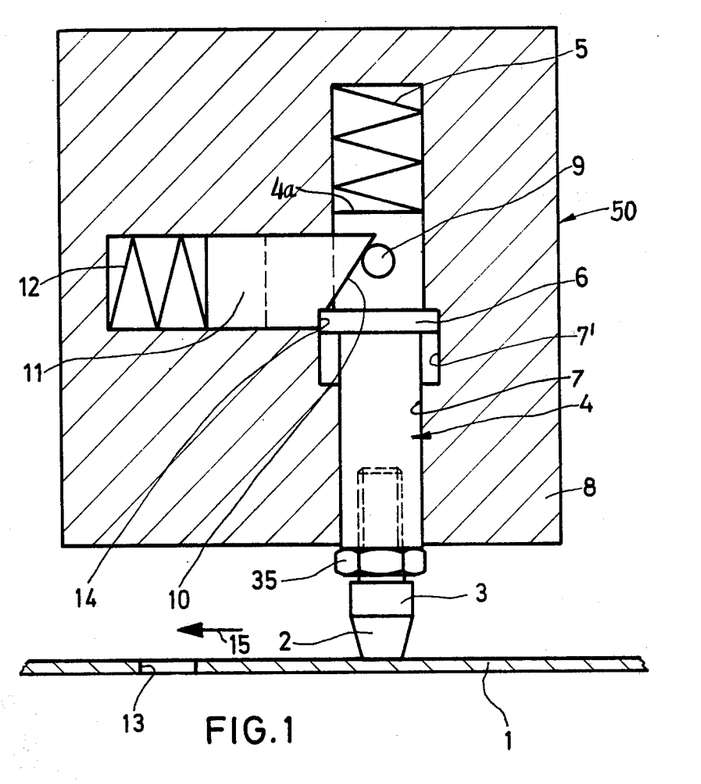
FIG. 1 is a vertical sectional view of a copying tracer constructed in accordance with the invention.
Figure 2:
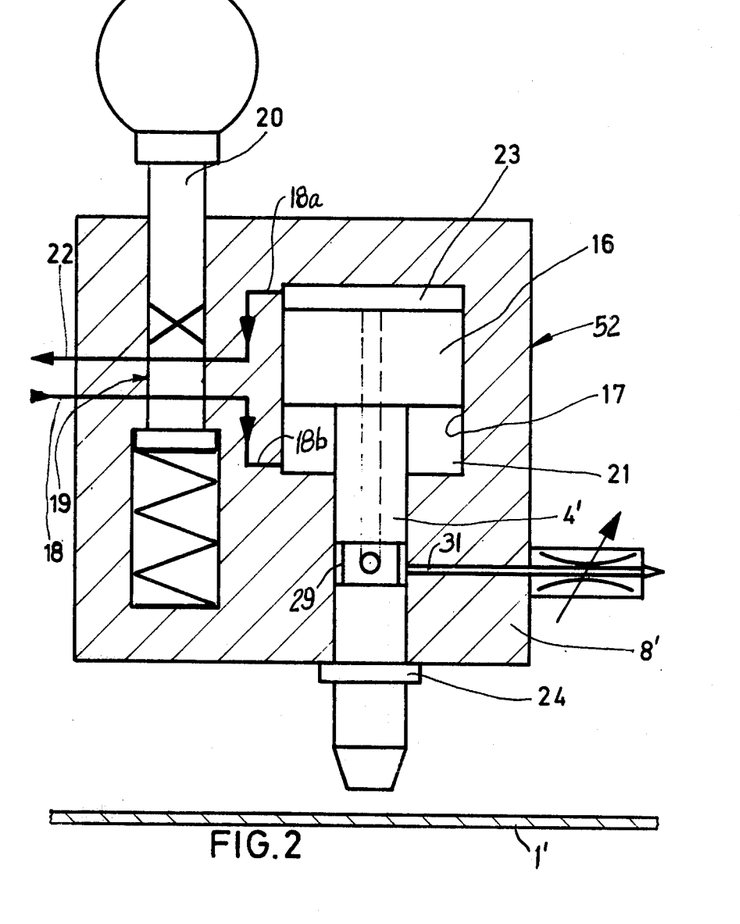
FIG. 2 is a vertical section, similar to FIG. 1, of another embodiment of the invention.
Figure 3:
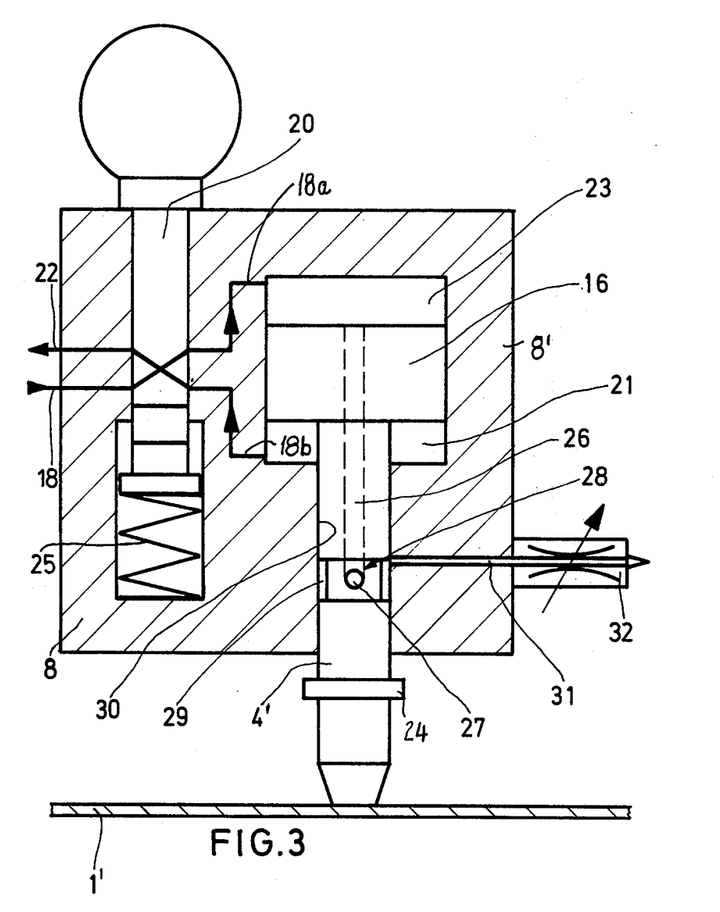
FIGS. 3 and 4 are views similar to FIG. 2 indicating the tracer in advanced stages of operation.
Figure 4:
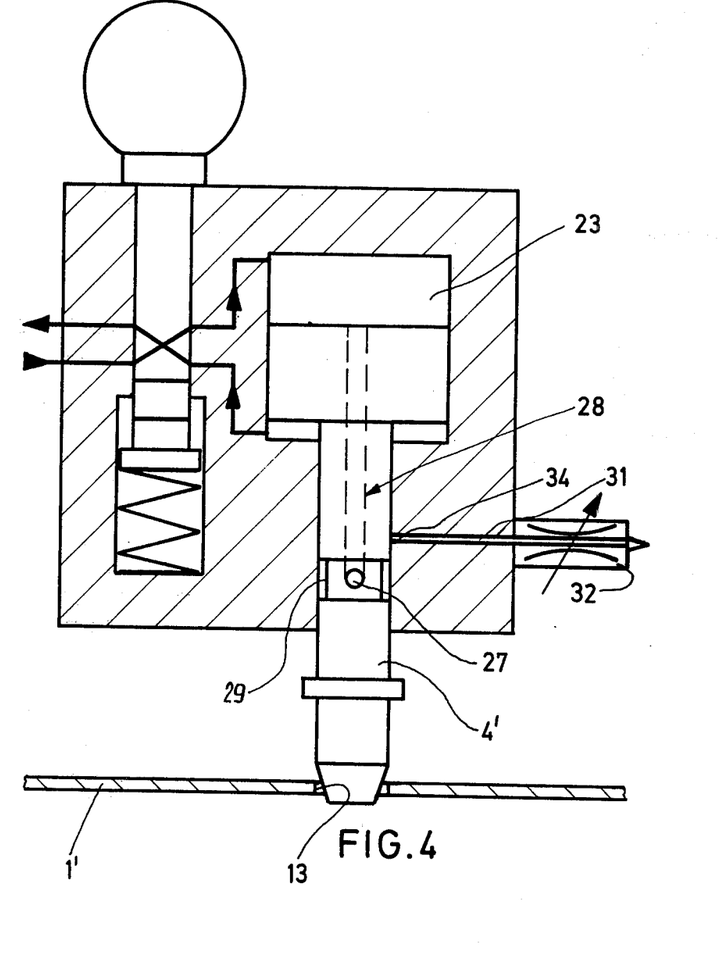

The pressure means, which in FIG. 1 comprises the separately acting spring members 5 and 12 in conjunction with tracer 4 and slider 11, may be replaced, for example, by a fluid-pressure operated system of the type indicated in the embodiment of FIGS. 2 to 4, which includes a tracer, generally designated 52, having a housing 8' with a tracer plunger 4' slidable in a bore thereof. Tracer plunger 4' includes a widened cylindrical portion 16 which operates in an enlarged bore 17 of the housing 8'. A compressed air line or other line of fluid pressure 18 is connected into the housing 8' through a reversing valve 19 and either connecting line 18a and 18b to a respective end 23 or 21 of the piston 16. The reversing valve 19 includes a slider 20 which may be positioned as indicated in FIG. 2, in which event, the fluid pressure is delivered through line 18 to the conduit 18b to the space 21 and the other space 23 is connected through line 18a and the valve 19 to a discharge line 22. Since only line 18 is under pressure, piston 16 and tracer 4 are displaced upwardly until collar 24 applies against the bottom of housing 8'. The copying tracer may thus be moved without contacting the template 1'.

If, as shown in FIG. 3, the pressure line 18 is connected to line 18a which connects to space 23, the return line 18b is connected to space 21 and return conduit 22. This connection is effected by depressing plunger 20 against the force of a counterspring 25 and this produces a pressure acting on the top of piston 16 to urge the tracer 4' downwardly. This causes collar 24 to move downwardly below the bottom end of housing 8'. This causes tracer 4' to apply against template 1'.

In accordance with another feature of the invention, the pressure means also includes a longitudinal bore 26 through piston 16 and a portion of the tracer plunger 4' which terminates in a transverse 27 in an annular cutout of tracer 4' which defines an annular passage or groove 29. This tracer passage, including the passage 26, passage 27 and the annular space 29, is generally designated 28, and it communicates when the tracer 4' is on the surface of template 1' with a connecting passage 31 which extends into a bore 30 of housing 8' and connects at its outer end to a choke 32. The choke 32 is indicated as being adjustable and it is mounted on the exterior of housing 8'. Annular passage 29 and outlet passage 31 are disposed so that in the position of copying, the tracer shown in FIG. 3, will be supplied by a pressure supplied by the pressure means which acts as a pressure medium 23 on the top of piston 16 but reduced by the escaping of pressure through the combined passage 28 and the outlet passage 31 and choke 32 to the atmosphere. The amount of pressure, therefore, which acts on the piston 16 in the upper space 23 is dependent upon the adjustment of choke 32.

As soon as the copying tracer 4 enters a bore or hollow 13 of template 1', annular groove 29, which is formed in the surface of tracer plunger portion 4', moves downwardly below passage 31 so that there is no possibility for the air to escape through choke 32. The passage 31 and the passage including groove 29 and bore 26 comprise means responsive to movement of said tracer to apply the application of a separate force to the tracer after it moves downwardly into a template bore 13, or to discontinue the separate force when it moves upwardly beyond a predetermined position. This results in an increase of pressure acting on tracer 4' and an accelerated penetration of the tracer 4' into the bore 13 of template 1 and the establishment of a stronger contact pressure therein. The transverse bore 27 and annular groove 29 may be omitted if a direct communication between the end of the passage 28 and the inner orifice 34 of outlet passage 31 is provided instead. In this case, of course, the copying tracer 4' must be fixed against turning.

In the embodiments of FIGS. 2 to 4, it is also possible to provide a telescopic construction of the tracer plunger 4' or 4. Such a telescopic construction is shown in FIG. 1, wherein the lower or tip portion 3 of tracer 4 is threaded into the upper plunger portion and it is anchored in an adjusted position by a threaded nut 35. This adjustment may be used for defining the location of the annular groove 29 in relationship to the passage 31.

While specific embodiments of the invention have been shown and described in detail to illustrate the application of the principles of the invention, it will be understood that the invention may be embodied otherwise without departing from such principles.

What is claimed is:

1. A copying tracer for tracing templates having depressions, such as hollows, recesses, bores, etc., particularly for stamping or nibbling machines, comprising a housing having a bore therein, a copying tracer movable in the bore of said housing and having an outer template engaging end portion, and pressure means in said housing acting on said tracer to apply a biasing force against said tracer in a direction to urge the template engaging end into engagement with the template, said pressure means having a separate force applicator effective to apply an increased biasing force against said tracer after said tracer is displaced downwardly below the template by a predetermined amount when said tracer enters into the depression said tracer including means movable thereby to control said separate force applicator such that said separate force is applied only after said tracer moves said predetermined amount.

2. A copying tracer, according to claim 1, wherein said increased biasing force is applied only while said tracer is in the depression.

3. A copying tracer, according to claim 1, wherein said tracer includes a plunger portion and a conical end portion threaded into said plunger portion and being extensible and retractable by the threading.

4. A copying tracer for tracing templates having depressions, such as hollows, recesses, bores, etc., particularly for stamping or nibbling machines, comprising a housing having a bore therein, a copying traver movable in the bore of said housing and having an outer template engaging end portion, and pressure means in said housing acting on said tracer to apply a biasing force against said tracer in a direction to urge the template engaging end into engagement with the template and effective to apply an increased biasing force against said tracer after said tracer is displaced downwardly below the template by a predetermined amount when it enters into the depression, said tracer including a plunger portion, said pressure means including a spring acting against said plunger portion to bias it toward said template, a slider bore defined in said housing in an angle to the bore for said tracer plunger portion, a slider movable in said slider bore and having an oblique end, said plunger portion having a projecting pin portion engaged by the oblique end of said slider, said pressure means including a slider spring biasing said slider to engage the oblique portion in said pin and to act thereon to move said plunger by an additional force in the direction of contact with said template, and means on said plunger portion engageable with said slider for locking said slider initially until said plunger is displaced and to unlock said slider to permit the slider to apply an additional biasing force on said plunger portion after said tracer is moved downwardly said predetermined amount.

5. A copying tracer for tracing templates having depressions, such as hollows, recesses, bores etc., particularly for stamping or nibbling machines, comprising a housing having a bore therein, a copying tracer movable in the bore of said housing and having an outer template engaging end portion, and pressure means in said housing acting on said tracer to apply a biasing force against said tracer in a direction to urge the template engaging end into engagement with the template and effective to apply an increased biasing force against said tracer after said tracer is displaced downwardly below the template by a predetermined amount when it enters into the depression, said pressure means comprising a fluid pressure supply, said tracer having a piston portion, means for connecting said fluid pressure supply to the bore of said housing to provide a fluid pressure biasing force acting on said piston portion, and means for by-passing some of the fluid pressure biasing force acting on said piston during the time in which said tracer is engaged with said template but to apply all of the biasing force on said tracer after said tracer is moved by a predetermined amount.

6. A copying tracer, according to claim 5, wherein said fluid pressure supply includes a reversing valve connected to the bore on respective sides of said piston, a connecting passage through said piston and said tracer for bypassing part of the fluid pressure acting on said piston and a choke line connected to said passage for regulating the amount of pressure which is bypassed from said piston.

7. A copying tracer, according to claim 6, wherein said choke is adjustable.

8. A copying tracer according to claim 6, wherein said piston portion of said tracer comprises a double acting pneumatic piston movable in a bore of said housing comprising a cylinder, said tracer having a surface carried by said piston and movable therewith, said reversing valve including means for applying pressure on the opposite surface of said piston.

9. A copying tracer, according to claim 8, wherein said reversing valve includes a slide member, spring means biasing said slide member to one position, said slide member being displaceable against said spring means to position said reversing valve in an opposite reversed position for the reverse flow of fluid from said fluid pressure supply to a respective side of said piston.

10. A copying tracer, according to claim 9, wherein said passage through said piston terminates along the length of said tracer, said tracer comprising a plunger portion having an annular groove therein in communication with said passage, said choke line including a line located in said housing and connected into the bore containing said plunger, said line extending substantially in alignment with the annular groove of said plunger when the end of said tracer is engaged with said template, but being moved out of alignment therewith so as to stop the bypass of pressure from the top of the piston when the piston is moved in a direction to move the tracer into a recess of the template.

11. A copying tracer, according to claim 10, wherein said pressure means is adjustable for supplying the initial biasing pressure and for the increased biasing force acting on said tracer.

* * * * *

UNITED STATES PATENT OFFICE
CERTIFICATE OF CORRECTION

Patent No. 3,939,566    Dated February 24, 1976

Inventor(s) Erich Brekle et al.

It is certified that error appears in the above-identified patent and that said Letters Patent are hereby corrected as shown below:

In the heading of the Patent [73] should read as follows:

--Assignee: Firma Trumph Maschinen AG, Switzerland --.

*Signed and Sealed this*

*Eighteenth* Day of *October 1977*

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 3,939,566      Dated February 24, 1976

Inventor(s) Erich Brekle et al.

It is certified that error appears in the above-identified patent and that said Letters Patent are hereby corrected as shown below:

In the heading of the Patent [73] should read as follows:
-- Trumpf Maschinen A. G., Zug, Switzerland --.

This certificate supersedes Certificate of Correction issued October 18, 1977.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*